United States Patent
Aizawa et al.

(10) Patent No.: US 10,967,810 B2
(45) Date of Patent: Apr. 6, 2021

(54) VEHICLE ROOF STRUCTURE

(71) Applicant: Toyota Jidosha Kabushiki Kaisha, Toyota (JP)

(72) Inventors: Kai Aizawa, Toyota (JP); Masayuki Okano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 43 days.

(21) Appl. No.: 16/416,342

(22) Filed: May 20, 2019

(65) Prior Publication Data
US 2019/0359150 A1    Nov. 28, 2019

(30) Foreign Application Priority Data
May 24, 2018 (JP) .............................. JP2018-099941

(51) Int. Cl.
*B60R 13/02* (2006.01)
*B60R 13/08* (2006.01)
(52) U.S. Cl.
CPC ...... *B60R 13/0218* (2013.01); *B60R 13/0815* (2013.01)
(58) Field of Classification Search
CPC ..... B60R 13/02; B60R 13/08; B60R 13/0815; B60R 13/2018
USPC ................................................ 296/214, 39.1
See application file for complete search history.

(56) References Cited

U.S. PATENT DOCUMENTS

2006/0103172 A1* 5/2006 Veen ................... B60R 13/0815
296/214

FOREIGN PATENT DOCUMENTS

| FR | 2256658 | * | 7/1975 |
|----|---------|---|--------|
| JP | 2005096659 A | | 4/2005 |
| JP | 2007-168699 A | | 7/2007 |
| JP | 2007-186091 A | | 7/2007 |
| JP | 2015-189355 A | | 11/2015 |
| JP | 2017-105325 A | | 6/2017 |

OTHER PUBLICATIONS

Translation of FR2256658 (Year: 1975).*

* cited by examiner

*Primary Examiner* — Dennis H Pedder
(74) *Attorney, Agent, or Firm* — Dinsmore & Shohl LLP

(57) ABSTRACT

A roof structure includes a roof panel constituting a roof of a vehicle, a roof headlining constituting a ceiling of a vehicle cabin, and a stiffening board disposed between the roof panel and the roof headlining. The stiffening board is attached to a lower face of the roof panel by adhering at plural adhesion portions. Steps are formed at the stiffening board between the respective plural adhesion portions so as to widen a space between the stiffening board and the lower face of the roof panel.

2 Claims, 9 Drawing Sheets

VEHICLE ROOF STRUCTURE

CROSS-REFERENCE TO RELATED APPLICATION

This application is based on and claims priority under 35 USC 119 from Japanese Patent Application No. 2018-099941 filed on May 24, 2018, the disclosure of which is incorporated by reference herein.

BACKGROUND

Technical Field

The present disclosure relates to a vehicle roof structure.

Related Art

Japanese Patent Application Laid-Open (JP-A) No. 2017-105325, for example, discloses a roof structure including a reinforcement plate. The reinforcement plate is disposed between a vehicle roof panel and a molded ceiling (roof headlining), and is affixed to a lower face of the roof panel using an adhesive to reinforce the roof panel.

However, when a space between the roof panel and the reinforcement plate is narrow, there is a possibility that soundproofing performance might be reduced due to sympathetic vibrations (resonance). Increasing the space between the roof panel and the reinforcement plate in response would make it difficult to adhere the reinforcement plate to the lower face of the roof panel using an adhesive. There is thus still room for improvement in a structure for a roof that achieves both easy manufacture and a suppressed reduction in soundproofing performance.

SUMMARY

The present disclosure obtains a vehicle roof structure capable of achieving both easy manufacture and a suppressed reduction in soundproofing performance.

A first aspect of a roof structure for a vehicle according to the present disclosure includes a roof panel constituting a roof of a vehicle, a roof headlining constituting a ceiling of a vehicle cabin, and a stiffening board disposed between the roof panel and the roof headlining. The stiffening board is attached to a lower face of the roof panel by adhering at plural adhesion portions, and steps are formed at the stiffening board between the respective plural adhesion portions so as to widen a space between the stiffening board and the lower face of the roof panel.

In the first aspect, the stiffening board is attached to the lower face of the roof panel by adhering at the plural adhesion portions. The manufacture of the vehicle roof structure is accordingly easy. Moreover, the steps are formed at the stiffening board between the respective plural adhesion portions so as to widen the space between the stiffening board and the lower face of the roof panel. A thickness of an air layer is accordingly increased in the regions where the steps are formed. This suppresses sympathetic vibrations (resonance) from occurring thereby suppressing a reduction in soundproofing performance. Namely, the first aspect achieves both ease of manufacture and a suppressed reduction in soundproofing performance for a roof.

A vehicle roof structure of a second aspect is the vehicle roof structure of the first aspect, wherein a sheet thickness direction central portion at a portion of the stiffening board where the step is formed is disposed at a substantially intermediate position between the lower face of the roof panel and an upper face of the roof headlining.

In the second aspect, the sheet thickness direction central portion at the portion of the stiffening board where the step is formed is disposed at the substantially intermediate position between the lower face of the roof panel and the upper face of the roof headlining. The spaces from the stiffening board to the roof panel and the roof headlining are accordingly optimized, further suppressing a reduction in soundproofing performance.

A vehicle roof structure of a third aspect is the vehicle roof structure of the first aspect or the second aspect, wherein a shortest distance between the lower face of the roof panel and an upper face of a portion of the stiffening board where the step is formed is configured to be a value calculated by multiplying the square of a shortest distance between the lower face of the roof panel and an upper face of the roof headlining by 0.00885.

In the third aspect, the shortest distance between the lower face of the roof panel and the upper face of the portion of the stiffening board where the step is formed is the value calculated by multiplying the square of the shortest distance between the lower face of the roof panel and the upper face of the roof headlining by 0.00885. The spaces from the stiffening board to the roof panel and the roof headlining are accordingly optimized, further suppressing a reduction in soundproofing performance.

The first aspect enables both ease of manufacture and a suppressed reduction in soundproofing performance to be achieved for a roof.

The second aspect or the third aspect enable a reduction in soundproofing performance for a roof to be suppressed further.

BRIEF DESCRIPTION OF THE DRAWINGS

Exemplary embodiments of the present disclosure will be described in detail based on the following figures, wherein.

DETAILED DESCRIPTION

Detailed explanation follows regarding an exemplary embodiment of the present disclosure, with reference to the drawings. For ease of explanation, in each of the drawings the arrow UP indicates a vehicle upward direction, the arrow FR indicates a vehicle forward direction, and the arrow LH indicates a vehicle left direction, as appropriate. Accordingly, in the following explanation, unless specifically stated otherwise, references to up and down directions, front and rear directions, and left and right directions refer to up and down in a vehicle vertical direction, front and rear in a vehicle front-rear direction, and left and right in a vehicle left-right direction (vehicle width direction).

Figure 1:
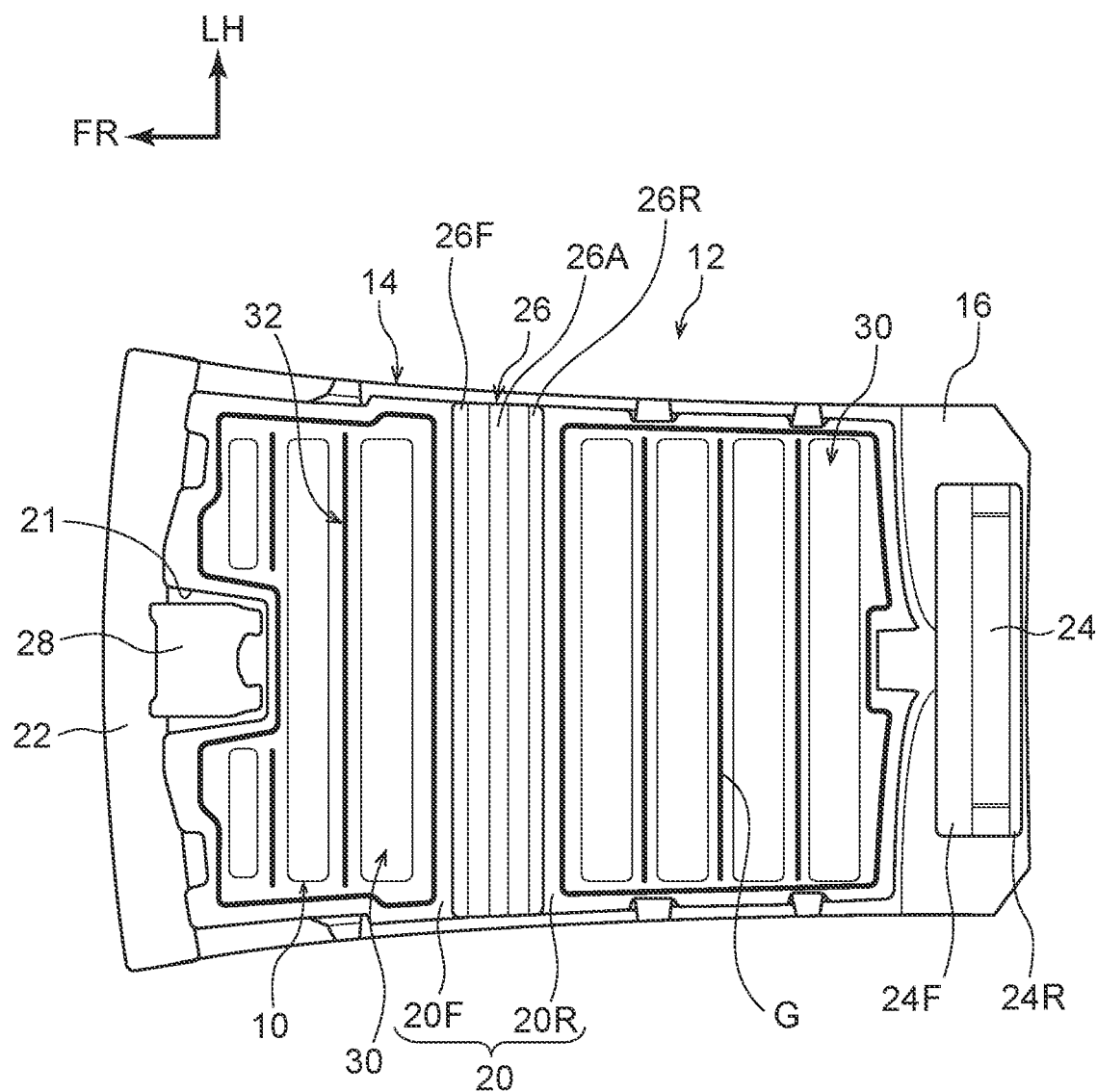
FIG. 1 is a bottom view illustrating a roof structure for a vehicle according to an exemplary embodiment, as viewed from inside a vehicle cabin with a roof headlining removed.
Figure 2:
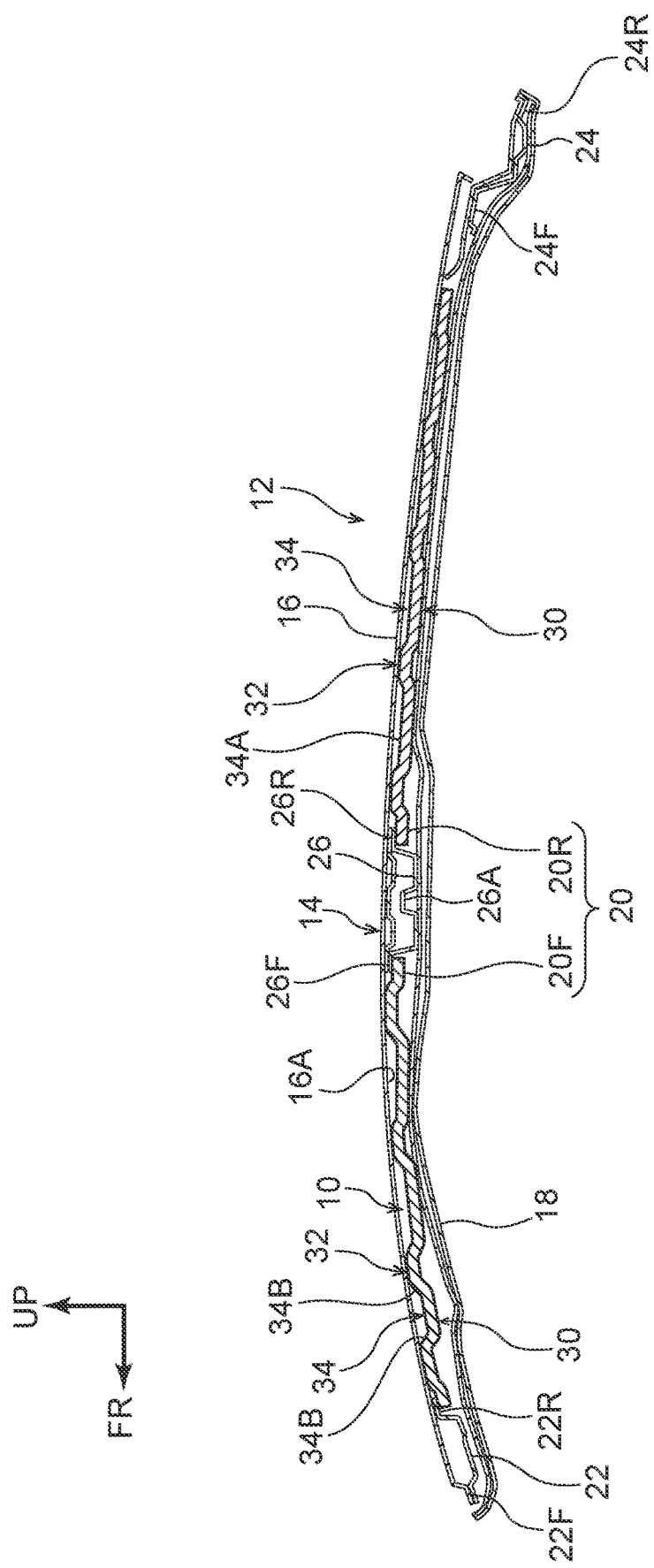
FIG. 2 is cross-section illustrating a vehicle roof structure according to an exemplary embodiment, as viewed along a vehicle width direction.

As illustrated in FIG. 1 and FIG. 2, a roof structure 10 of a vehicle 12 according to the present exemplary embodiment includes a roof panel 16, a roof headlining 18, and a stiffening board 20. The roof panel 16 is made of metal (for example steel) in a substantially rectangular flat sheet shape, for configuring a roof 14 of the vehicle 12. The roof headlining 18 (see FIG. 2) is made of resin in a substantially rectangular flat sheet shape for configuring a vehicle cabin ceiling. The stiffening board 20 is made of urethane foam in a substantially rectangular flat sheet, shape and is disposed between the roof panel 16 and the roof headlining 18.

A pair of left and right roof side rails (not illustrated in the drawings), which are made from metal (for example steel) and formed with closed cross-section profiles, are disposed so as to extend along the vehicle front-rear direction at vehicle width direction outer side end portions of an upper section of the vehicle 12. A front header 22 and a rear header 24, each of which is made from metal. (for example steel) and formed with a substantially hat-shaped profile as viewed in cross-section from the vehicle width direction, extend along the vehicle width direction so as to respectively span between front end portions and rear end portions of the roof side rails.

The roof panel 16 is formed with a size covering across between the pair of left and right roof side rails and between the front header 22 and the rear header 24. Lower faces of peripheral edge portions on both left and right sides of the roof panel 16 are joined from the vehicle upper side, by welding or the like, to upper faces of flanges (not illustrated in the drawings) at the vehicle width direction inner side of the respective roof side rails.

Lower faces of peripheral edge portions at the front and rear sides of the roof panel 16 are respectively: joined from the vehicle upper side, by welding or the like, to an upper face of a flange 22F at the vehicle front side of the front header 22 and an upper face of a flange 22R at the vehicle rear side of the front header 22, and to an upper face of a flange 24F at the vehicle front side of the rear header 24 and an upper face of a flange 24R at the vehicle rear side of the rear header 24. The front header 22 and the rear header 24 accordingly form lose d cross-section profiles in combination with the roof panel 16.

Metal (for example steel) roof center reinforcement 26 is formed with substantially hat-shaped profile, as viewed in cross-section from the vehicle width direction. The roof center reinforcement 26 extends along the vehicle width direction so as to span between vehicle from-rear direction substantially central portions of the respective roof side rails. A lower face of a vehicle front-rear direction substantially central portion of the roof panel 16 is joined from the vehicle upper side, by welding or the like, to an upper face of a flange 26F at the vehicle front side of the roof center reinforcement 26 and to an upper face of a flange 26R at the vehicle rear side of the roof center reinforcement 26.

The roof center reinforcement 26 accordingly forms a closed cross-section profile in combination with the roof panel 16. Note that the roof center reinforcement 26 is provided at substantially the same position in the vehicle front-rear direction as a pair of center pillars (not illustrated in the drawings) that each extend in the vehicle vertical direction at the two respective side sections of the vehicle 12.

As viewed in cross-section from the vehicle width direction, a vehicle front-rear direction substantially central portion of the roof center reinforcement 26 is formed with a recess 26A recessed toward the vehicle upper side. The recess 26A increases the number of ridge lines extending along the vehicle width direction in the roof center reinforcement 26, so as to increase rigidity of the roof center reinforcement 26 in the vehicle width direction.

Figure 3:
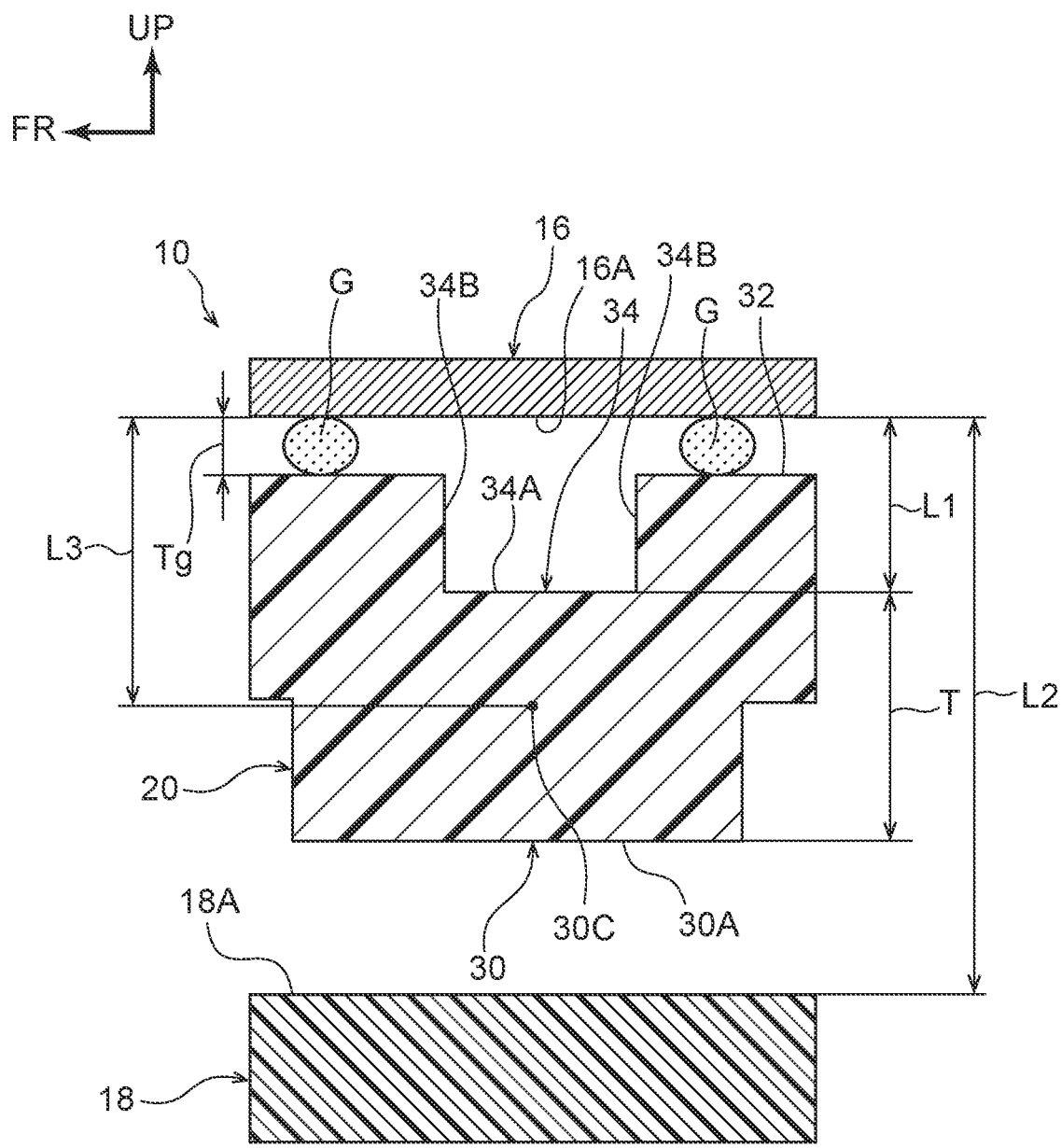
FIG. 3 is a schematic diagram illustrating part of a vehicle roof structure according to an exemplary embodiment, as viewed from the vehicle width direction.
Figure 9:
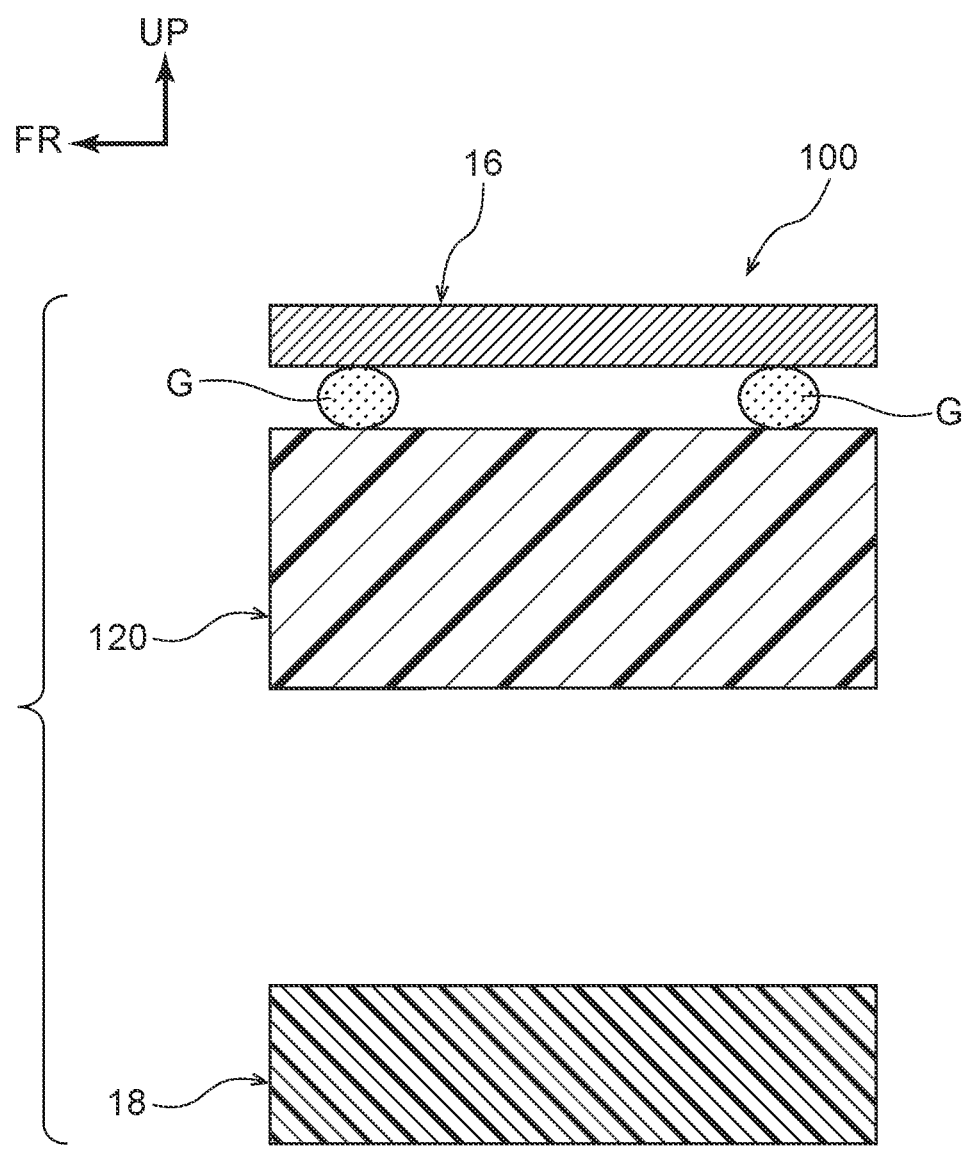
FIG. 9 is a schematic diagram illustrating part of a vehicle roof structure according to a comparative example, as viewed from the vehicle width direction.

Note that as illustrated in FIG. 2, the roof panel 16, the roof headlining 18, and the stiffening board 20 are each formed so as to curve in a convex profile toward the vehicle upper side, as viewed in cross-section from the vehicle width direction. FIG. 3 and FIG. 9 are schematic diagrams illustrating these components with flat faces to simplify illustration. The roof panel 16 according to the present exemplary embodiment has a reduced sheet thickness (mass) in order to reduce weight.

As illustrated in FIG. 1 and FIG. 2, the stiffening board 20 is a sheet shaped member split into two parts, front and rear. The stiffening board 20 is configured by a front board 20F that covers from the front header 22 to the roof center reinforcement 26, and a rear board 20R that covers from the roof center reinforcement 26 to the rear header 24.

Portions (adhesion portions 32, described later) of the stiffening board 20 at respective upper faces of the front board 20F and the rear board 20R are integrally attached to a lower face 16A of the roof panel 16 by adhering with an adhesive G (see FIG. 1, FIG. 3), such as a mastic adhesive or the like. The rigidity of the roof panel 16 is thereby reinforced by the stiffening board 20.

The stiffening board 20 is, for example, formed by coating a sheet of urethane foam with glass fibers. A thickness T of the stiffening board 20 (see FIG. 3) is from 5 mm to 20 mm. In some embodiments, the weight of the stiffening board 20 per unit area (per 1 $m^2$) is less than 2000 g, or less than 1000 g.

The thickness T of the urethane stiffening board 20 according to the present exemplary embodiment is around 13 mm, and the weight per unit area (per 1 $m^2$) is around 760 g. In some embodiments, a thickness Tg of the adhesive G (see FIG. 3) is no greater than 5 mm from the perspective of ease of manufacturing the roof 14.

As illustrated in FIG. 1, a notch 21 is formed in a vehicle width direction central portion of a vehicle front end section of the front board 20F. The notch 21 has a substantially rectangular shape in plan view, and is formed so as to avoid both a room light and a sensor unit 28 including a camera or the like to detect a situation ahead of the vehicle. Namely, the front board 20F is formed in a substantially square-sided C-shape in bottom view (in plan view). The rear board 20R is formed in a substantially rectangular shape in bottom view (in plan view).

As illustrated in FIG. 1 to FIG. 3, as viewed in cross-section from the vehicle width direction, plural projections 30 are formed at the stiffening board 20 (the front board 20F and the rear board 20R) so as to project toward the vehicle lower side. The projections 30 each extend along the vehicle width direction so as to be arranged in a row in the vehicle front-rear direction. Plural planar adhesion portions (adhesion faces) 32 to be adhered to the lower face 16A of the roof panel 16 by the adhesive G are configured between the respective projections 30.

In other words, the plural adhesion portions (adhesion faces) 32 to be adhered to the lower face 16A of the roof panel 16 by the adhesive G are formed at the stiffening board 20 (the front board 20F and the rear board 20R), and the plural projections 30 are formed between the respective adhesion portions 32 so as to extend along the vehicle width direction and project toward the vehicle lower side.

Note that although in the present exemplary embodiment there are three of the projections 30 formed to the front board 20F, and there are four of the projections 30 formed to the rear board 20R, the number of the projections 30 (and the number of steps 34, described later) are not limited to the number illustrated (seven). The number of projections 30 (and the number of the steps 34 described later) may be set as appropriate according to the size of the roof 14.

As viewed in cross-section from the vehicle width direction, the steps 34 are each configured at the upper face side of the respective projections 30 on the stiffening board 20 (the front board 20F and the rear board 20R), so as to widen the space in the vehicle vertical direction to the lower face 16A of the roof panel 16 (thus forming an air layer, described later). Namely, the projections 30 (the steps 34) are formed by bending the stiffening board 20, and the sheet thickness of the projections 30 (the steps 34) is the same as the sheet thickness of the adhesion portions 32.

The steps 34 at the upper face side of the projections 30 are each configured by an upper face 34A disposed substantially parallel to the lower face 16A of the roof panel 16, and inclined faces 34B integrally contiguous to, and running from, the two respective vehicle front-rear direction ends of the upper face 34A to the respective adhesion portions (adhesion faces) 32. Note that although the inclined faces 34B in the schematic diagram of FIG. 3 are illustrated as vertical faces, the actual inclined faces 34B are inclined with respect to the front-rear direction (horizontal direction) and the up-down direction (vertical direction), as illustrated in FIG. 2.

As illustrated in FIG. 3, as viewed in cross-section from the vehicle width direction, a sheet thickness central portion 30C of each projection 30 of the stiffening board 20, namely a central portion 30C between the upper face of the projection 30 (the upper face 34A of the step 34) and a lower face 30A of the projection 30 is disposed at a substantially intermediate position between the lower face 16A of the roof panel 16 and an upper face 18A of the roof headlining 18.

In other words, as viewed in cross-section from the vehicle width direction, a shortest distance (distance along the vertical direction) L1 from the lower face 16A of the roof panel 16 to the upper face 34A of the step 34 of the stiffening board 20 has a value calculated by multiplying the square of a shortest distance (distance along the vertical direction) L2 from the lower face 16A of the roof panel 16 to the upper face 18A of the roof headlining 18 by 0.00885 (L1=L2× L2×0.00885).

To explain this using specific values, in a case in which the shortest distance L2 from the lower face 16A of the roof panel 16 to the upper face 18A of the roof headlining 18 is, for example, L2=40 nm, the shortest distance L1 from the lower face 16A of the roof panel 16 to the upper face 34A of the step 34 of the stiffening board 20 is L1=40×40× 0.00885=14.16 mm. Namely, the shortest distance L1≈14 mm.

Moreover, in a case in which the thickness T of the stiffening board 20 is, for example, T=13 mm, the shortest distance (distance along the vertical direction) from the upper face of the projection 30 (the upper face 34A of the step 34) to the sheet thickness direction central portion 30C of the projections 30 is 13 min/2=6.5 mm. Namely, a shortest distance L3 from the lower face 16A of the roof panel 16 to the central portion 30C is L3=14 mm+6.5 mm=20.5 mm.

Accordingly, as described above, as viewed in cross-section from the vehicle width direction, the sheet thickness direction central portions 30C of the projections 30 of the stiffening board 20, namely the central portions 30C between the upper faces of the projections 30 (the upper faces 34A of the steps 34) and the lower faces 30A of the projections 30 are disposed at a substantially intermediate position between the lower face 16A of the roof panel 16 and the upper face 18A of the roof headlining 18.

Explanation follows regarding the evidence behind setting the height position of the projections 30 (the steps 34) of the stiffening board 20 at the position described above.

Consider, as an example, a case in which the shortest distance L2 from the lower face 16A of the roof panel 16 to the upper face 18A of the roof headlining 18 is 40 mm, the thickness T of the stiffening board 20 is 13 mm, and the weight of the stiffening board 20 per unit area (per 1 m$^2$) is 757 g.

Figure 4A:
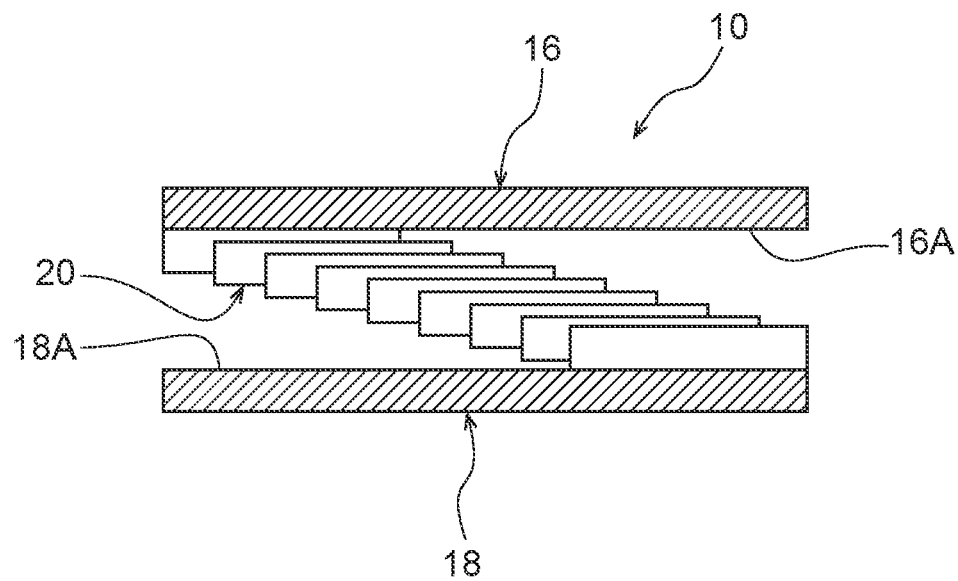
FIG. 4A is a schematic diagram illustrating a stiffening board at various different height positions.
Figure 4B:
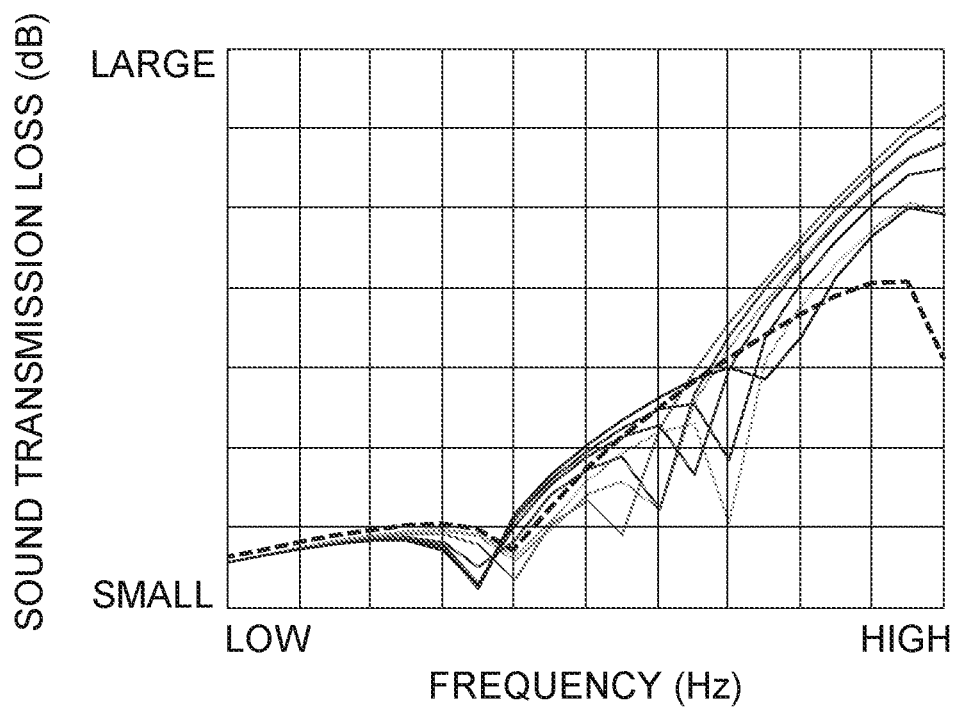
FIG. 4B is a graph illustrating sound transmission toss against frequency for the corresponding respective height positions illustrated in FIG. 4A.

As illustrated in FIG. 4A, the height positions of the stiffening board 20 disposed between the roof panel 16 and the roof headlining 18 are set in a stepwise manner at plural positions (for example seven positions), and frequencies and sound transmission losses for each of these height positions are investigated. The results are illustrated in FIG. 4B. Note that the soundproofing effect is greater (the soundproofing performance is better) the higher the value of the sound transmission loss on the vertical axis.

The roof structure 10 has a double-walled structure in cases illustrated in FIG. 4A in which there is no gap present between the lower face 16A of the roof panel 16 and the upper face of the stiffening board 20 (in cases in which the two members are touching), and in cases illustrated in FIG. 4A in which there is no gap present between the upper face 18A of the roof headlining 18 and the lower face of the stiffening board 20 (in cases in which the two members are touching). These cases are illustrated by the dashed line in the line graph illustrated in FIG. 4B.

The roof structure 10 has a triple-walled structure in cases illustrated in FIG. 4A in which a gap is present between the lower face 16A of the roof panel 16 and the upper face of the stiffening board 20 and a gap is also present between the upper face 18A of the roof headlining 18 and the lower face of the stiffening board 20. These cases are illustrated the solid lines in the line graph illustrated in FIG. 4B.

As illustrated in FIG. 4B, in cases in which the roof structure 10 has a double-walled structure, sympathetic vibrations (resonance) occur only at a single location, whereas in cases in which the roof structure 10 has a triple-walled structure, sympathetic vibrations (resonance) occur at two locations. Namely, whereas there is a single location where the sound transmission loss (soundproofing effect) falls in a double-walled structure, there are two locations where this occurs for each of the plural height positions set for the stiffening board 20 in a triple-wailed structure.

Figure 6:
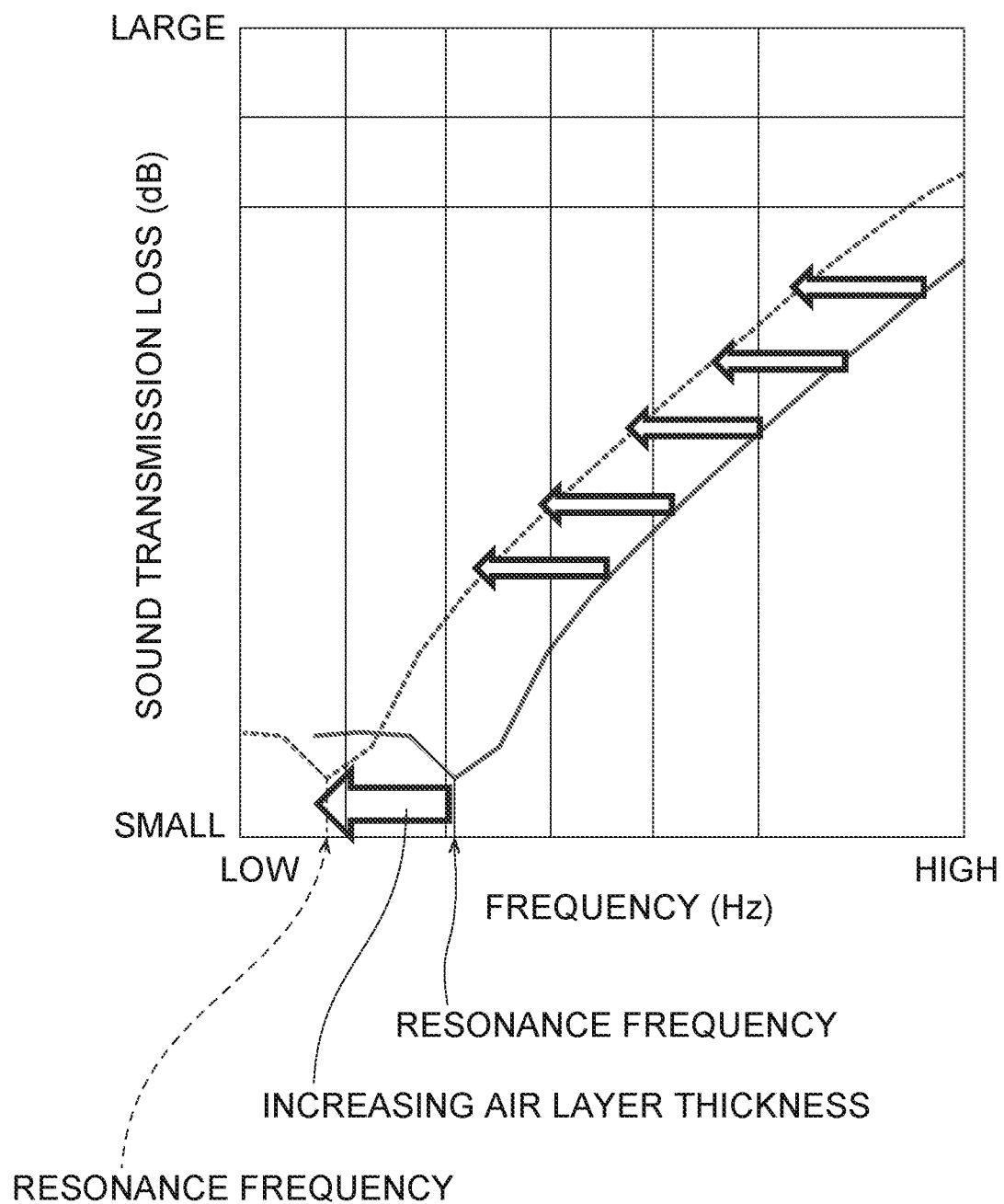
FIG. 6 is a graph comparing sound transmission loss against frequency before and after increasing the thickness of an air layer.

As illustrated in FIG. 6, it is known that the frequency of sympathetic vibrations (resonance) shifts toward the lower frequency side as the thickness of an air layer increases. Namely, increasing the air layer thickness increases the sound transmission loss at the sympathetic vibration (resonance) frequency and above, thus improving the soundproofing performance. Note that the "air layer thickness" referred to herein corresponds to the shortest distance L1 (see FIG. 3) between the lower face 16A of the roof panel 16 and the upper face 34A of the respective step 34.

As illustrated in FIG. 4B, the sympathetic vibration (resonance) frequency shifts toward the lower frequency side as the gap between the lower face 16A of the roof panel 16 and the upper face of the stiffening hoard 20 gets wider (the greater the shortest distance L1). The sound transmission loss (soundproofing effect) is at its greatest when the stiffening board 20 (the central portion 30C) is disposed at the substantially intermediate position between the lower face 16A of the roof panel 16 and the upper face 18A of the roof headlining 18.

Figure 5:
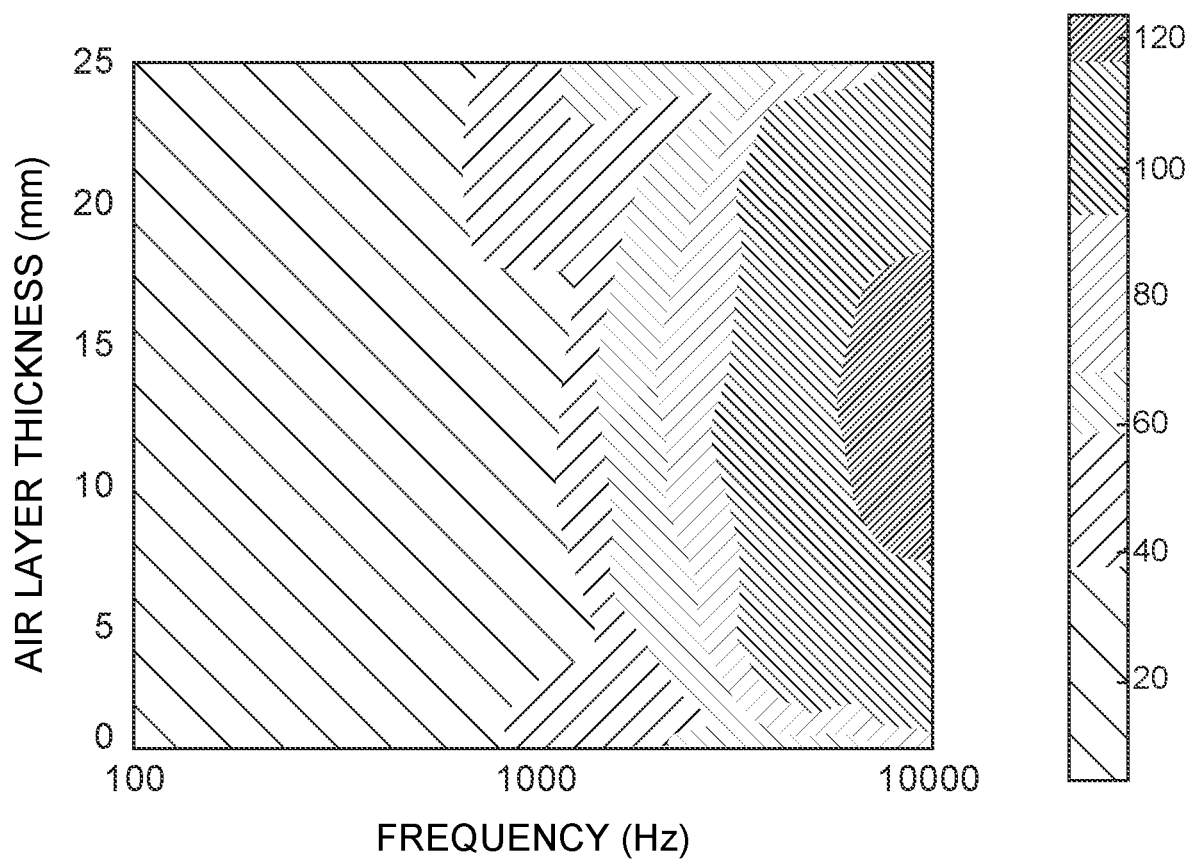
FIG. 5 is a contour diagram to represent sound transmission loss as illustrated in FIG. 4B against frequency and air layer thickness.

To illustrate this point more clearly, FIG. 5 depicts the results given in FIG. 4B so as to show frequency against air layer thickness (the shortest distance L1). The bar on the right side of FIG. 5 is the legend for the depiction of the sound transmission loss, with the soundproofing effect being greater (the soundproofing performance being better) the higher the value. FIG. 5 illustrates the results for a case in which the shortest distance L2 is 40 mm.

It is apparent from FIG. 5 that in cases in which the shortest distance L2 is 40 mm, the highest sound transmission loss (soundproofing effect) is achieved when the air layer thickness (the shortest distance L1) is from 10 mm to 15 mm. Namely, it is apparent that the highest sound transmission loss (soundproofing effect) is achieved when the stiffening board 20 (the central portion 30C) is disposed at the substantially intermediate position between the lower face 16A of the roof panel 16 and the upper face 18A of the roof headlining 18.

Using a similar method, the respective sound transmission loss (soundproofing effect) is found to be greatest when the air layer thickness (the shortest distance L1) is about 10 mm for cases in which the shortest distance L2 is 35 mm, when the air layer thickness (the shortest distance L1) is about 8 mm for cases in which the shortest distance 12 is 30 mm, and when the air layer thickness (the shortest distance L1) is about 6 mm in cases in which the shortest distance L2 is 25 mm. The above equation L1=L2×L2×0.00885 is obtained by performing regression analysis on these results to find a relationship equation therebetween.

Explanation follows regarding operation of the roof structure 10 according to the present exemplary embodiment configured as described above.

When the stiffening board 20 is adhered to the lower face 16A of the roof panel 16, sympathetic vibrations (resonance) are generated due to the air layer formed between the lower face 16A of the roof, panel 16 and the upper face of the stiffening board 20. Sound is amplified at the frequency of the sympathetic vibrations (resonance), diminishing the sound transmission loss (soundproofing effect), and thereby lowering the soundproofing performance.

As illustrated in the graph of FIG. 6, the sympathetic vibration (resonance) frequency is shifted toward the lower frequency side by increasing the air layer thickness (the shortest distance L1). Namely, increasing the air layer thickness (the shortest distance L1) increases the sound transmission loss (soundproofing effect) at the sympathetic vibration (resonance) frequency and above, thereby suppressing a reduction in the soundproofing performance.

Accordingly, as illustrated in FIG. 2 and FIG. 3, in the roof structure 10 according to the present exemplary embodiment, the projections 30 are formed by bending the stiffening board 20 so as to form the steps 34 at the upper face side of the projections 30. This widens the vertical direction space (the shortest distance L1) between the upper face 34A and the lower face 16A of the roof panel 16 (increases the air layer thickness).

Figure 7:
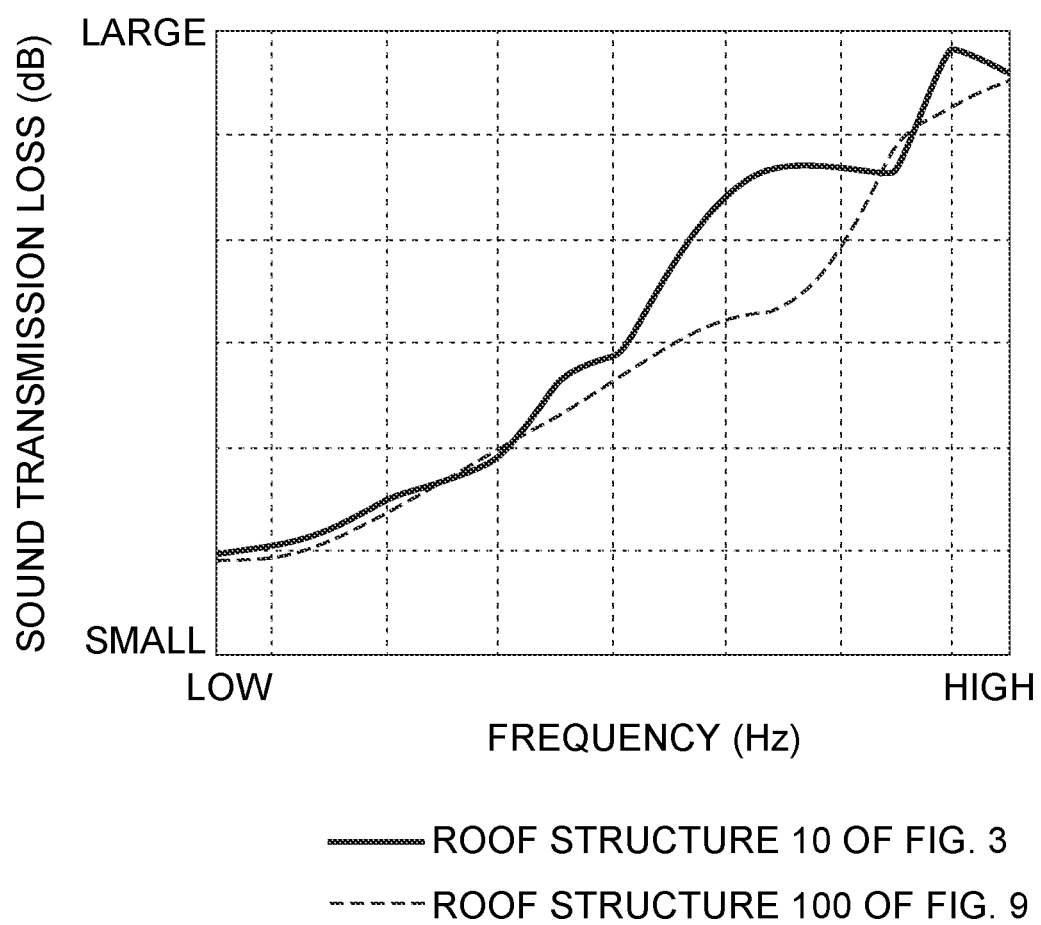
FIG. 7 is a graph of sound transmission loss against frequency in which the roof structure illustrated in FIG. 3 is compared to the roof structure illustrated in FIG. 9.

This enables the sound transmission loss (soundproofing effect) to be increased in comparison to a roof structure 100 of a comparative example that includes a stiffening board 120 not formed with the steps 34, such as that illustrated in FIG. 9, thereby enabling a reduction in soundproofing performance to be suppressed. Namely, as illustrated in FIG. 7, the soundproofing performance can be improved, particularly with respect to noise vibrations in mid- and high-frequency regions.

Figure 8:
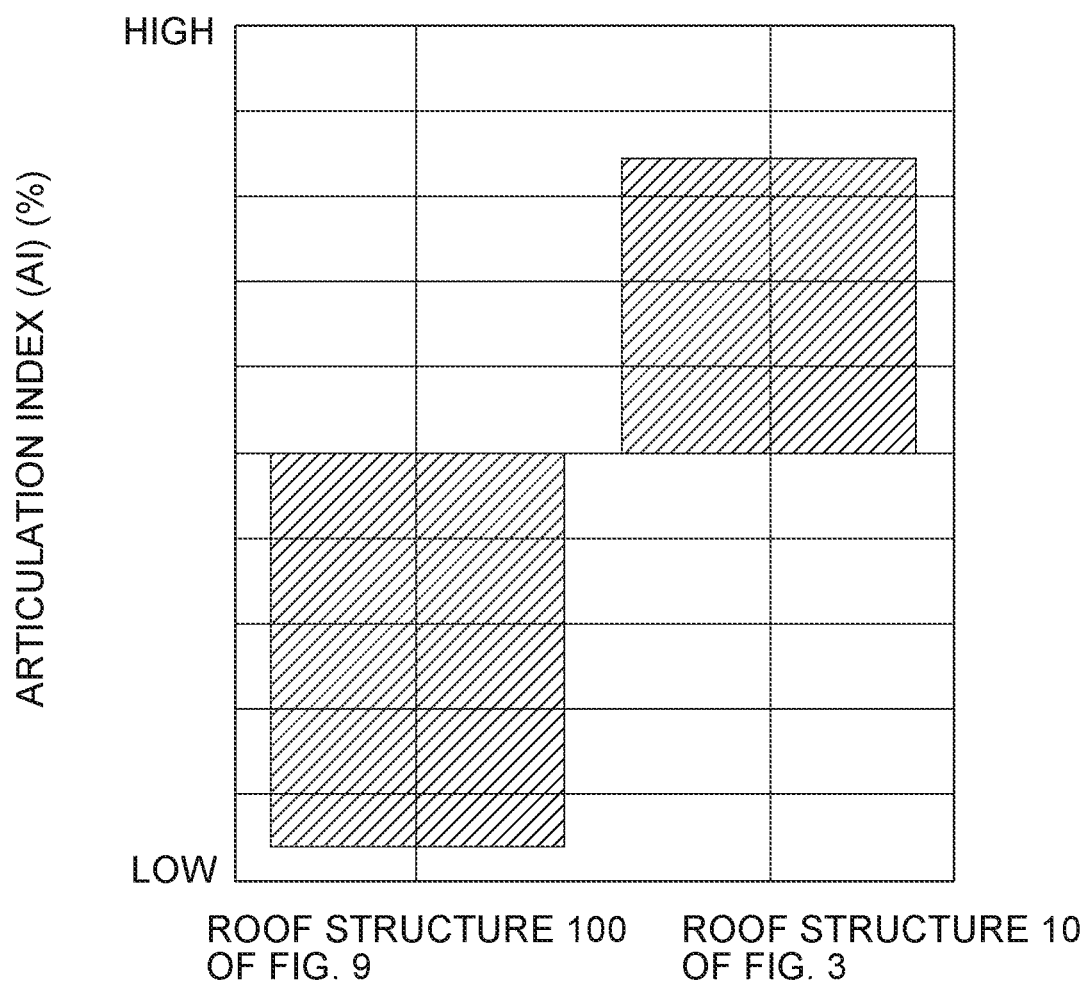
FIG. 8 is a bar chart illustrating articulation indices of a vehicle provided with the roof structure illustrated in FIG. 3 and of a vehicle provided with the roof structure illustrated in FIG. 9.

Accordingly, as illustrated in FIG. 8, the roof structure 10 according to the present exemplary embodiment (illustrated in FIG. 3) enables an articulation index (AI) inside the vehicle 12 cabin when the vehicle 12 is traveling at 100 km/h, for example, to be raised in comparison to the roof structure 100 according to the comparative example (illustrated in FIG. 9.

As viewed in cross-section from the vehicle width direction, the sheet thickness direction central portions 30C of the projections 30 of the stiffening board 20, namely the central portions 30C between the upper faces of the projections 30 (the upper faces 34A of the steps 34) and the lower faces 30A of the projections 30, are disposed at the substantially intermediate position between the lower face 16A of the roof panel 16 and the upper face 18A of the roof headlining 18.

In other words, as viewed in cross-section from the vehicle width direction, the shortest distance L1 between the lower face 16A of the roof panel 16 and the upper faces 34A of the steps 34 of the stiffening board 20 should be set as a value calculated by multiplying the square of the shortest distance L2 from the lower face 16A of the roof panel 16 to the upper face 18A of the roof headlining 18 by 0.00885 (L1=L2×L2×0.00885).

Namely, the vertical direction spaces from the stiffening board 20 to the roof panel 16 and the roof headlining 18 are optimized compared to cases in which the height position of the stiffening board 20 (the central portion 30C) is not set to the above position (i.e. the height position found using the above relationship equation). This enables the sound transmission loss (soundproofing effect) to be further increased, enabling a reduction in the soundproofing performance to be suppressed further (enabling the soundproofing performance to be raised further).

The roof structure 10 according to the present exemplary embodiment does not require the vertical direction space (the shortest distance L1) between the lower face 16A of the roof panel 16 and the upper face of the stiffening board 20 to be widened by increasing the thickness Tg of the adhesive G. There is therefore no concern that the ease of manufacture of the roof 14 might be adversely affected. Namely, the roof structure 10 according to the present exemplary embodiment enables both ease of manufacture and suppression of a reduction in the soundproofing performance to be achieved fir the roof 14.

The number of ridge lines extending along the vehicle width direction is increased due to forming the plural projections 30 (the steps 34) in the stiffening hoard 20. This also enables the rigidity and strength of the stiffening board 20 to be raised in the vehicle width direction.

Although the roof structure 10 according to the present exemplary embodiment has been explained based on the drawings, the roof structure 10 according to the present exemplary embodiment is not limited to the configuration illustrated in the drawings, and appropriate modifications may be made to the design thereof within a range that does not depart from the spirit of the present disclosure.

For example, the stiffening board 20 is not limited to being formed from urethane foam, and the stiffening board 20 may be made from corrugated cardboard or the like. Moreover, the stiffening board 20 is not limited to a configuration adhered to the lower face 16A of the roof panel 16 using the adhesive G, such as a mastic adhesive or the like. For example, a configuration may be adopted in which the stiffening board 20 is adhered to the lower face 16A of the roof panel 16 using an adhesion method such as, for example, double-sided adhesive tape or the like (not illustrated in the drawings).

In the roof structure 10 according to the present exemplary embodiment, although the stiffening board 20 is bent to form the plural projections 30 on the stiffening board 20 (the front board 20F and the rear board 20R), and the plural steps 34 are formed at the upper face sides of the projections 30, there is no limitation to such a configuration. For example, a configuration may be adopted in which the lower face of the stiffening board 20 is an entirely flat face, and plural steps 34 are formed at the upper face side thereof. Namely, a configuration, may be adopted in which the thickness of the stiffening board 20 is thinner at locations where the steps 34 are formed.

Although the roof structure 10 according to the present exemplary embodiment has the plural projections 30 (the steps 34) formed at the stiffening board 20 (the front board 20F and the rear board 20R) so as to be arranged in a row along the vehicle front-rear direction, as viewed in cross-section from the vehicle width direction, there is no limitation to such a configuration. Although not illustrated in the drawings, a configuration may be adopted in which plural projections (steps) are formed at the stiffening board 20 (the front board 20F and the rear board 20R) so as to be arranged in a row along, the vehicle width direction, as viewed in cross-section from the vehicle front-rear direction. Similar advantageous effects can also be obtained by such a configuration.

What is claimed is:

1. A roof structure for a vehicle, comprising:
a roof panel constituting a roof of a vehicle;
a roof headlining constituting a ceiling of a vehicle cabin; and
a stiffening board disposed between the roof panel and the roof headlining, the stiffening board being attached to a lower face of the roof panel by adhering at a plurality of adhesion portions, and a step being formed at the stiffening board between respective ones of the plurality of adhesion portions so as to widen a space between the stiffening board and the lower face of the roof panel,
wherein a sheet thickness direction central portion, at a portion of the stiffening board where a central portion of the step is formed, is disposed substantially equidistant between the lower face of the roof panel and an upper face of the roof headlining.

2. A roof structure for a vehicle, comprising:
a roof panel constituting a roof of a vehicle;
a roof headlining constituting a ceiling of a vehicle cabin; and
a stiffening board disposed between the roof panel and the roof headlining, the stiffening board being attached to a lower face of the roof panel by adhering at a plurality of adhesion portions, and a step being formed at the stiffening board between respective ones of the plurality of adhesion portions so as to widen a space between the stiffening board and the lower face of the roof panel,
wherein a shortest distance between the lower face of the roof panel and an upper face of a portion of the stiffening board where the step is formed is configured to be a value calculated by multiplying a square of a shortest distance between the lower face of the roof panel and an upper face of the roof headlining by 0.00885.

* * * * *

UNITED STATES PATENT AND TRADEMARK OFFICE
CERTIFICATE OF CORRECTION

PATENT NO. : 10,967,810 B2  
APPLICATION NO. : 16/416342  
DATED : April 6, 2021  
INVENTOR(S) : Kai Aizawa and Masayuki Okano Page 1 of 1

It is certified that error appears in the above-identified patent and that said Letters Patent is hereby corrected as shown below:

In the Specification

In Column 2, Line(s) 52, delete "toss" and insert --loss--, therefor.

In Column 3, Line(s) 28, after "sheet", delete ",".

In Column 3, Line(s) 51, after "respectively", delete ":".

In Column 3, Line(s) 59, delete "lose d" and insert --closed--, therefor.

In Column 5, Line(s) 1, delete "hoard" and insert --board--, therefor.

In Column 6, Line(s) 4, delete "ease" and insert --case--, therefor.

In Column 6, Line(s) 55, after "illustrated", insert --by--, therefor.

In Column 6, Line(s) 66, delete "triple-wailed" and insert --triple-walled--, therefor.

In Column 7, Line(s) 14, delete "hoard" and insert --board--, therefor.

In Column 7, Line(s) 45, delete "12" and insert --L2--, therefor.

In Column 8, Line(s) 64, delete "fir" and insert --for--, therefor.

In Column 8, Line(s) 67, delete "hoard" and insert --board--, therefor.

In Column 10, Line(s) 1, after "along", delete ",".

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*